(12) United States Patent
Ben-Romdhane et al.

(10) Patent No.: US 7,889,976 B2
(45) Date of Patent: Feb. 15, 2011

(54) SYSTEM AND METHOD FOR TELEVISION PROGRAMMING DATA MANAGEMENT

(75) Inventors: Mohamed Ben-Romdhane, Irvine, CA (US); Mohy F. Abdelgany, Irvine, CA (US)

(73) Assignee: Newport Media, Inc., Lake Forest, CA (US)

( * ) Notice: Subject to any disclaimer, the term of this patent is extended or adjusted under 35 U.S.C. 154(b) by 1377 days.

(21) Appl. No.: 11/373,385

(22) Filed: Mar. 10, 2006

(65) Prior Publication Data

US 2007/0212017 A1    Sep. 13, 2007

(51) Int. Cl.
*H04N 5/76* (2006.01)
*H04N 5/445* (2006.01)
*G06F 3/00* (2006.01)
*G06F 13/00* (2006.01)

(52) U.S. Cl. .................. 386/291; 386/296; 386/299; 715/700; 715/716; 725/37; 725/38; 725/58

(58) Field of Classification Search .............. 386/46, 386/83, 92; 725/38, 39, 49, 46, 50, 58, 48, 725/37; 455/466
See application file for complete search history.

(56) References Cited

U.S. PATENT DOCUMENTS

2002/0082910 A1*  6/2002  Kontogouris .......... 705/14
2002/0199194 A1* 12/2002  Ali ........................ 725/46
2003/0036395 A1*  2/2003  Proidl ..................... 455/466
2003/0154484 A1*  8/2003  Plourde et al. .......... 725/58
2004/0049787 A1    3/2004  Maissel et al.
2004/0179811 A1    9/2004  Kikkawa et al.
2004/0187164 A1    9/2004  Kandasamy et al.

FOREIGN PATENT DOCUMENTS

WO    WO 92/22983    * 12/1992

* cited by examiner

*Primary Examiner*—Thai Tran
*Assistant Examiner*—Hung Q Dang
(74) *Attorney, Agent, or Firm*—Rahman LLC

(57) ABSTRACT

A system, method, and service of managing data comprises establishing a computerized user profile guideline corresponding to selected television programming interests of a user; instructing a processor to manage data based on the computerized user profile guideline, wherein the data is received from a television programming broadcaster; and managing access to specified television programming when the computerized user profile guideline corresponding to the selected television programming interests of the user is satisfied. The process of managing access may comprise alerting the user with information pertaining to the specified television programming.

1 Claim, 6 Drawing Sheets

FIG. 2

| Category | | User Interest | Alert |
|---|---|---|---|
| News | Breaking | X | |
| | Local | | |
| | Business | X | |
| | Etc. | | |
| Sports | Football | X | |
| | Basketball | | |
| | Soccer | X | X |
| | Etc. | | |
| Music Videos | Rock | X | |
| | Soul | | |
| | R&B | X | |
| | Etc. | | |
| Other | | | |

▲ Scroll Up

▼ Scroll Down 201, 202, 203, 204, 205, 200

FIG. 3

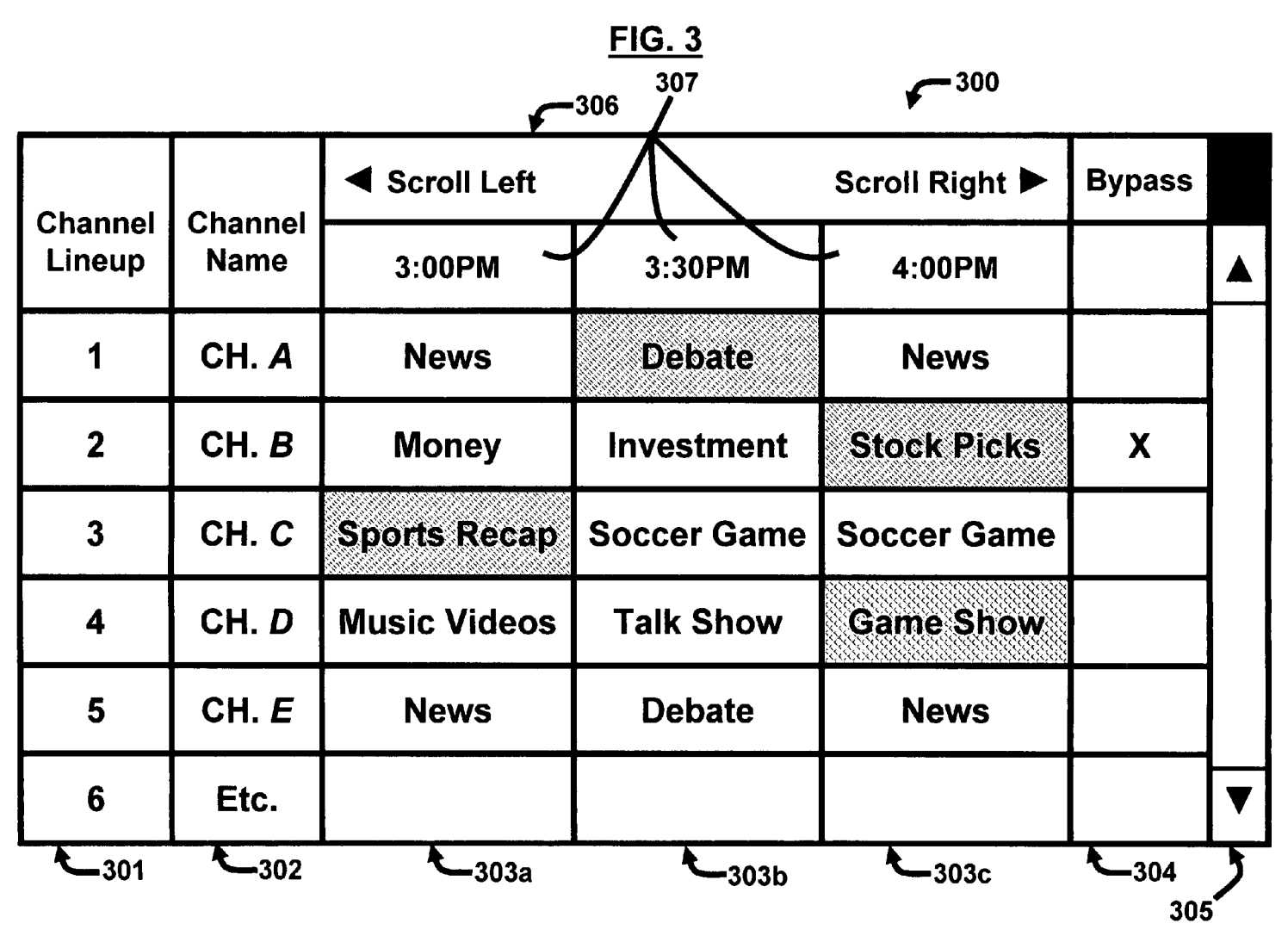

| Channel Lineup | Channel Name | ◀ Scroll Left 3:00PM | 3:30PM | Scroll Right ▶ 4:00PM | Bypass |
|---|---|---|---|---|---|
| 1 | CH. A | News | Debate | News | |
| 2 | CH. B | Money | Investment | Stock Picks | |
| 3 | CH. C | Sports Recap | Soccer Game | Soccer Game | X |
| 4 | CH. D | Music Videos | Talk Show | Game Show | |
| 5 | CH. E | News | Debate | News | |
| 6 | Etc. | | | | |

SYSTEM AND METHOD FOR TELEVISION PROGRAMMING DATA MANAGEMENT

BACKGROUND

1. Technical Field

The embodiments herein generally relate to data management for wireless technologies, and, more particularly, to data management associated with wireless television broadcasting technologies.

2. Description of the Related Art

TiVo® television programming recording systems, available from TiVo, Inc., California, USA, provide the ability to record, playback, pause, rewind, provide slow motion, and instantly replay a television program using a remote control. The TiVo® system generally offers digital recording between 35 and 80 hours of television programming depending on the specific TiVo® hardware being used. The TiVo® system allows one to synchronize one's television equipment to run smoothly under one recording system, it allows one the ability to record two shows at once with systems including dual-tuner functionality, and it offers online programming features that allow one to set up one's recording schedule with simply the click of a mouse. Some built-in options available within the TiVo® system's on-screen interfaces include a feature that will allow one to record television programs based on a preset variable that a user feeds into the TiVo® hardware. However, while the TiVo® system offers users with a valuable service, it generally requires a user to select from a predefined menu of options indicating specific times and channels relating to a particular television program or actor, and it generally only records television programs when instructed to do so by a user, and does not alert a user of programs that the user may be interested in. Accordingly, there remains a need for a new system and method of managing television programming data to alert viewers of programs of interest.

SUMMARY

In view of the foregoing, an embodiment herein provides a method of managing data and a program storage device readable by computer, tangibly embodying a program of instructions executable by the computer to perform the method of managing data, wherein the method comprises establishing a computerized user profile guideline corresponding to selected television programming interests of a user; instructing a processor to manage data based on the computerized user profile guideline, wherein the data is received from a television programming broadcaster; and managing access to specified television programming when the computerized user profile guideline corresponding to the selected television programming interests of the user is satisfied. The process of managing access may comprise alerting the user with information pertaining to the specified television programming. Moreover, the process of managing access may comprise recording the specified television programming in a data storage component operatively connected to the processor.

The alert may be issued by any of a receiver and a demodulator operatively connected to the processor, and the alert may comprise any of an audio alert, a video alert, a text only alert, and a vibration alert. The establishing of the computerized user profile guideline may occur at a remote location from the processor, and the alert may be received from cellular channels of a computer running a web application. Upon receiving the alert, the method may further comprise the user ignoring the alert. Alternatively, upon receiving the alert, the method may further comprise the user accepting the alert. The process of accepting the alert may comprise instructing the processor to cause the display of the specified television programming. Alternatively, the process of accepting the alert may comprise instructing the processor to record the specified television programming. Still alternatively, the process of accepting the alert may comprise instructing the processor to simultaneously cause the display of a particular specified television programming and record the particular specified television programming. Still alternatively, the process of accepting the alert may comprise instructing the processor to simultaneously cause the display of a first particular specified television programming and record a second particular specified television programming. Still alternatively, the process of accepting the alert may comprise instructing the processor to transmit the specified television programming to a secondary data storage device.

Upon receiving the alert, the method may further comprise the user accepting streaming media content of the specified television programming. Alternatively, upon receiving the alert, the method may further comprise the user accepting only video content of the specified television programming. Still alternatively, upon receiving the alert, the method may further comprise the user accepting only audio content of the specified television programming. Still alternatively, upon receiving the alert, the method may further comprise the user delaying acceptance of the specified television programming until a predetermined future time.

The method may further comprise displaying a tabular view of television programming available to be accessed by the user. Additionally, the method may further comprise identifying the specified television programming to be any of recorded, viewed, and transmitted to a secondary data storage device. The identifying process may comprise color coding selected specified television programming. Moreover, the method may further comprise storing the transmitted specified television programming in the secondary data storage device. Also, the method may further comprise accessing the stored transmitted specified television programming on a device other than the secondary data storage device. Furthermore, the method may further comprise accessing the stored transmitted specified television programming on the secondary data storage device. Additionally, the method may further comprise updating the content of the stored transmitted specified television programming. Also, the profile guideline and the processor may be configured in a portable wireless device.

The specified television programming may be viewable on the portable wireless device. The method may further comprise transmitting short messaging service (SMS) overlay messages to remote devices during broadcasting of the specified television programming, wherein the SMS overlay messages may comprise any of audio streaming, video streaming, images, and textual communication. The managing process may further comprise inferring suitability of potential television programming corresponding to the user based on the user profile guideline; and alerting the user of an existence of the potential television programming.

Another embodiment provides a service comprising establishing a computerized user profile guideline corresponding to selected television programming interests of a user; instructing a processor to manage data based on the computerized user profile guideline, wherein the data is received from a television programming broadcaster; and managing access to specified television programming when the computerized user profile guideline corresponding to the selected television programming interests of the user is satisfied.

Another embodiment provides a system for managing data, wherein the system comprises a user profile guideline corresponding to selected television programming interests of a user; a processor adapted to manage data based on the user profile guideline, wherein the data is received from a television programming broadcaster; and a user interface adapted to manage access to specified television programming when the computerized user profile guideline corresponding to the selected television programming interests of the user is satisfied. The system may further comprise any of a receiver and a demodulator operatively connected to the processor, wherein the any of the receiver and the demodulator may be adapted to alert the user with information pertaining to the specified television programming. The processor may be adapted to record the specified television programming in a data storage component operatively connected to the processor. Moreover, the alert may be issued by any of a receiver and a demodulator operatively connected to the processor, and wherein the alert may further comprise any of an audio alert, a video alert, a text only alert, and a vibration alert.

The computerized user profile guideline may be established at a remote location from the processor, and the alert may be received from cellular channels of a computer running a web application. Upon the user interface receiving the alert, the user interface may comprise a mechanism adapted to allow the user to ignore the alert. Alternatively, upon the user interface receiving the alert, the user interface may comprise a mechanism adapted to allow the user to accept the alert. Still alternatively, upon acceptance of the alert, the user interface may comprise a mechanism adapted to instruct the processor to cause the display of the specified television programming. Still alternatively, upon acceptance of the alert, the user interface may comprise a mechanism adapted to instruct the processor to record the specified television programming. Still alternatively, upon acceptance of the alert, the user interface may comprise a mechanism adapted to instruct the processor to simultaneously cause the display of a particular specified television programming and record the particular specified television programming.

The mechanism may be adapted to instruct the processor to simultaneously cause the display of a first particular specified television programming and record a second particular specified television programming. Upon acceptance of the alert, the user interface may comprise a mechanism adapted to instruct the processor to transmit the specified television programming to a secondary data storage device. Furthermore, upon receiving the alert, the user interface may comprise a mechanism adapted to accept streaming media content of the specified television programming. Alternatively, upon receiving the alert, the user interface may comprise a mechanism adapted to accept only video content of the specified television programming. Still alternatively, upon receiving the alert, the user interface may comprise a mechanism adapted to accept only audio content of the specified television programming. Still alternatively, upon receiving the alert, the user interface may comprise a mechanism adapted to delay acceptance of the specified television programming until a predetermined future time.

The user interface may be adapted to display a tabular view of television programming available to be accessed by the user. Additionally, the user interface may be adapted to identify the specified television programming to be any of recorded, viewed, and transmitted to a secondary data storage device. Furthermore, the user interface may identify the specified television programming to be any of recorded, viewed, and transmitted to a secondary data storage device by color coding selected specified television programming. Moreover, the secondary data storage device may be adapted to store the transmitted specified television programming.

The system may further comprise a device other than the secondary data storage device adapted to access the stored transmitted specified television programming, wherein the secondary data storage device may be adapted to access the stored transmitted specified television programming. Also, the system may further comprise a synchronizer operatively connected to the secondary data storage device and adapted to update the content of the stored transmitted specified television programming. The profile guideline and the processor may be configured in a portable wireless device. Additionally, the specified television programming may be viewable on the portable wireless device.

The system may further comprise a SMS overlay mechanism operatively connected to the processor and adapted to transmit SMS overlay messages to remote devices during broadcasting of the specified television programming, wherein the SMS overlay messages may comprise any of audio streaming, video streaming, images, and textual communication. The system may further comprise a computer application adapted to infer suitability of potential television programming corresponding to the user based on the user profile guideline; and any of a receiver and a demodulator operatively connected to the processor, wherein the any of the receiver and the demodulator may be adapted to alert the user of an existence of the potential television programming.

Another embodiment provides a system for managing data, wherein the system comprises means for establishing a computerized user profile guideline corresponding to selected television programming interests of a user; means for instructing a processor to manage data based on the computerized user profile guideline, wherein the data is received from a television programming broadcaster; and means for managing access to specified television programming when the computerized user profile guideline corresponding to the selected television programming interests of the user is satisfied.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 2 illustrates a schematic diagram of a user profile table according to an embodiment herein;

FIG. 3 illustrates a schematic diagram of a checkerboard record table according to an embodiment herein;

DETAILED DESCRIPTION OF PREFERRED EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a new system and method of managing television programming data to alert viewers of programs of interest. The embodiments herein achieve this by providing a system and method that alerts users of television programs of interest and allows a user the ability to view the program immediately on a handheld wireless receiver. In the context of the embodiments herein, the selected television programming interests of a user corresponds with the viewing interests of a user and may include broad categories such as types of television programs or the subject matter of television programs, for example, and not merely the specific television program title or specific times and channels relating to a particular television program or actor.

Figure 1:
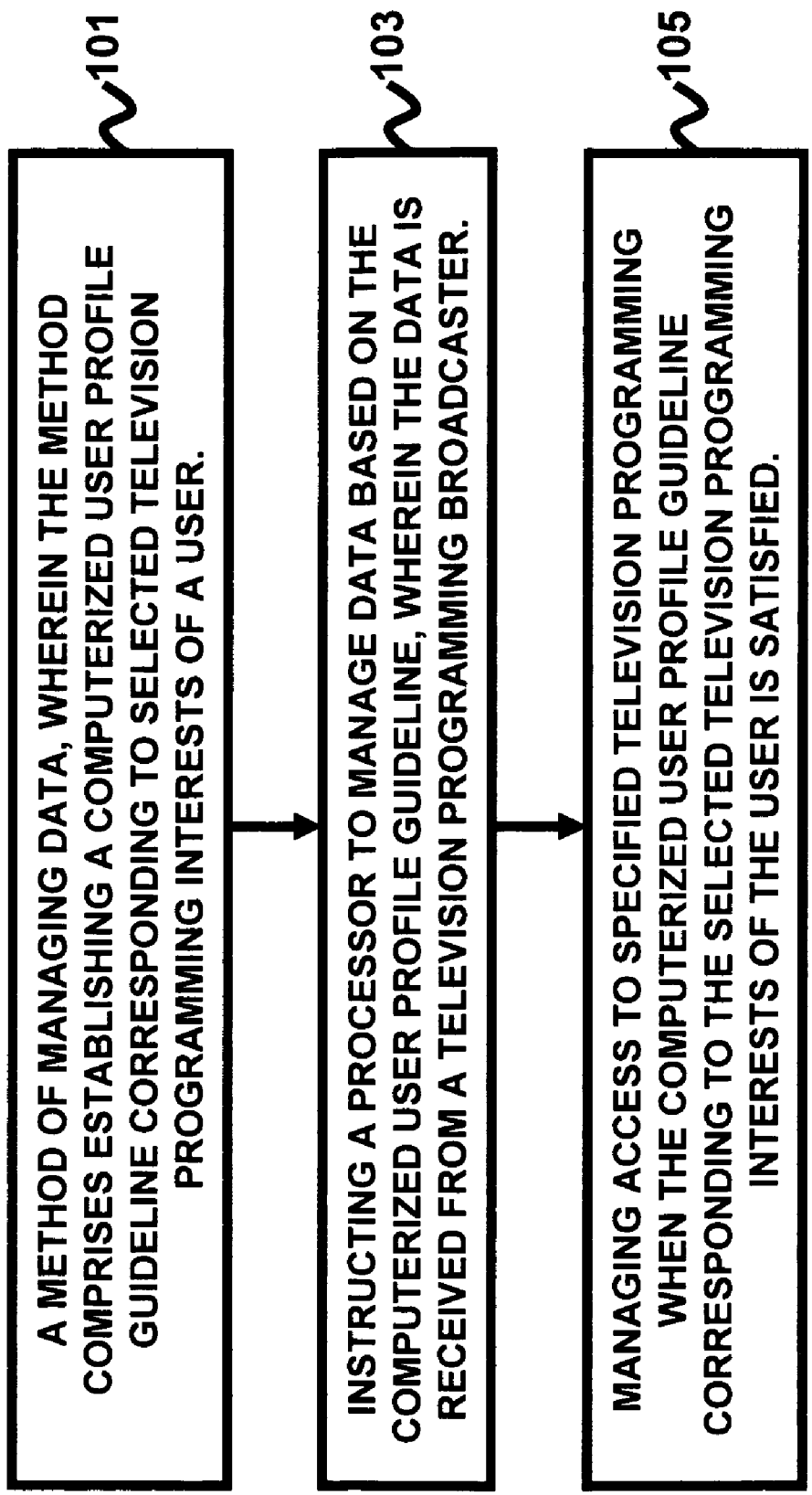
FIG. 1 is a flow diagram illustrating a preferred method according to an embodiment herein.

Referring now to the drawings, and more particularly to FIGS. 1 through 6, where similar reference characters denote corresponding features consistently throughout the figures, there are shown preferred embodiments. FIG. 1 illustrates a flow diagram of a method of managing data according to an embodiment herein, wherein the method comprises establishing (101) a computerized user profile guideline (i.e., a viewing preference profile) 200 (of FIGS. 2 and 5) corresponding to selected television programming interests of a user; instructing (103) a processor 508 (of FIG. 5) to manage data based on the computerized user profile guideline 200 (of FIGS. 2 and 5), wherein the data is received from a television programming broadcaster 510 (of FIG. 5); and managing (105) access to specified television programming when the computerized user profile guideline 200 (of FIGS. 2 and 5) corresponding to the selected television programming interests of the user is satisfied. In a preferred embodiment, the profile guideline 200 (of FIGS. 2 and 5) and the processor 507 (of FIG. 5) are configured in a portable wireless device 401 (of FIGS. 4 and 5), wherein the specified television programming may be viewable on the portable wireless device 401 (of FIGS. 4 and 5). Alternatively, the profile guideline 200 (of FIGS. 2 and 5) and the processor 507 (of FIG. 5) are configured in any suitable device, and the profile guideline 200 may be configured on a device separate from the processor 507.

Generally, according to the embodiments herein, a user fills in a viewing preference profile 200 (such as the one shown in tabular form in FIG. 2) using a user-friendly graphic user interface (GUI) 509 (of FIG. 5) and then the user periodically checks for user-defined alerts. The GUI 509 (of FIG. 5) may be configured to be a touch screen or may be manipulated by a mouse, keyboard, stylus, or any other suitable means. Additionally, the device 401 (of FIGS. 4 and 5) may be configured to receive voice commands from the user. If presented in tabular form, such as shown in FIG. 2, the viewing preference profile 200 may include a general category column 201, which includes general categories attributed to the types of television programming that is available to be viewed such as news, sports, music videos, etc. In an alternate embodiment the user from a remote location can fill in the preference profile 200, which is not necessarily on the host processor 507. For example, a third party might build a web application for users to log in from any computer and fill in their profile 200 and check for alerts. The web application could monitor global events, news, sports, and television programming and generate alerts to users based on their profile 200. The alerts would then be sent to the host processor 507 through a cellular channel. The host processor 507 would then alert the user. This is advantageous because (1) the television wireless receiver 401 (of FIGS. 4 and 5) might be in sleep mode and cannot receive alerts from the broadcast channel (typically the television receiver 401 in a non-viewing mode is in sleep mode); (2) it might prove to be more economical and feasible not to embed the alerts into the broadcast stream.

Again with reference to FIG. 2, a sub-category column 202 is then provided for each main category 201. For example, under the news category, the sub-category column 202 may include selections such as breaking news, local news, business news, etc. Next, in the user interest column 203, the user selects which of the types of television programming given in the subcategories 202 he/she desires to view. Alternatively, the user may simply select a general category 201 to thereby effectively selecting all subcategories 202 within a particular category 201. Thereafter, the user may specify whether he/she wishes for an alert to be issued for a specific type of television program by selecting the appropriate block in the alert column 204. An easy to use maneuver mechanism 205 is preferably provided, which may be embodied as a scroll up/down button on the GUI 509 (of FIG. 5). The viewing preference profile 200 (of FIGS. 2 and 5) is saved in the processor 507 (of FIG. 5) and may be edited whenever the user desires to change his/her viewing profile.

In one embodiment, the alert is issued by a receiver 405 (of FIG. 4) or demodulator 504 (of FIG. 5), and the alert preferably comprises any of an audio alert, a video alert, a text only alert, and a vibration alert or any other suitable form of alerting a user. The user is alerted to television programming based on an alert checklist established by the viewing preference profile 200 (of FIGS. 2 and 5), which establish the user's television programming interests. The information in the profile guideline 200 (of FIGS. 2 and 5) are passed on to the receiver 405 (of FIG. 4). The receiver 405 (of FIG. 4) then uses the information to create alert messages for the user.

Figure 5:
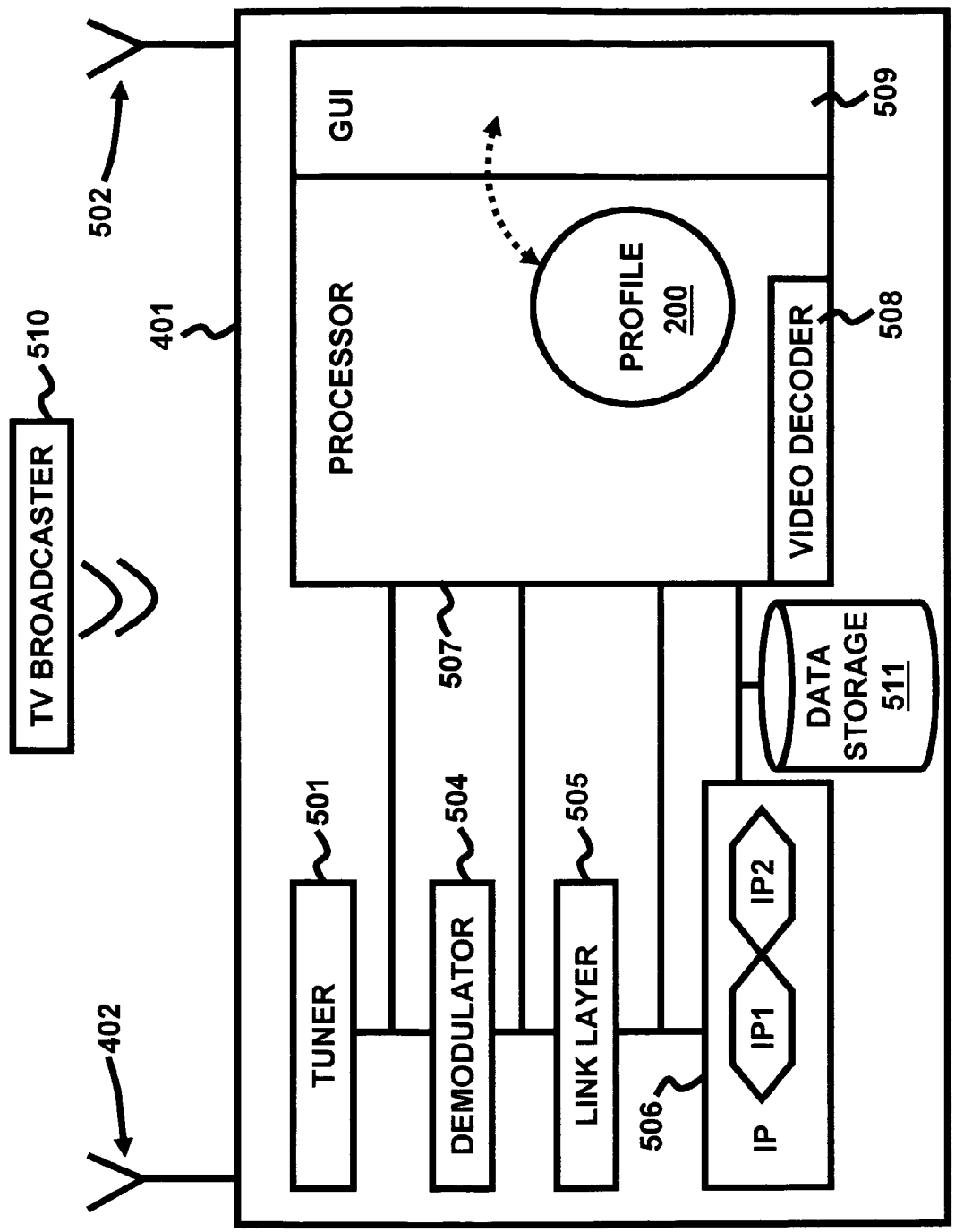
FIG. 5 illustrates a schematic diagram of a system according to an embodiment herein.

The receiver 405 can be different from one standard to another (DVB-H, DVB-T, DMB, ISDBT, FLO, DAB, FM, Mobile, etc.). In the case of DVB-H, as shown in FIG. 5, the receiver 405 comprises a RF tuner 501, a demodulator (PHY) 504, and a link layer (LL) 505. The alert can be embedded into the RF stream, demodulated by the demodulator 504 and extracted and interpreted by the link layer 505. In an alternate embodiment, the alert can be sent through a cellular network. For example, the receiver 401 is in sleep mode, and the alert is sent to the handset 401 through any cellular network, 3G, GPRS, GSM, CDMA, etc. In this case, the host processor 507 alerts the user. If the user accepts the alert, then it wakes up the receiver 401 and tunes into the correct channel (for viewing, recoding, or bypass record, etc.).

For example, one form of alert is through a vibration mode or streaming text. An example of an alert message is: "Ch21 is now showing breaking news . . ." or "Ch10 is now showing a soccer game Real Madrid vs. Manchester United . . ." or "Ch10: Soccer game Real Madrid vs. Manchester United to start in 5 minutes . . . ."

In a different embodiment the alert can be generated by a different application running on a different environment (e.g., internet) and sent to the handset 401 in any format (e.g., SMS) through a different (different from the television broadcast channel) channel (cellular, 3G, etc . . . ). The handset, or handheld, or any portable or non-portable device would receive the alert through the cellular channel. The host processor 507 on the handset 401 would then interrupt the alert.

The process of managing access (105) (of FIG. 1) comprises alerting the user with information pertaining to the specified television programming. Alternatively, the process of managing access (105) (of FIG. 1) comprises recording the specified television programming in the data storage component operatively connected to the processor 507 (of FIG. 5). The data storage component may be configured as a data storage device 511 (of FIG. 5) in the portable wireless device 401 (of FIGS. 4 and 5) or it may be configured in a separate (i.e., remote) storage device, such as the secondary data storage device 403 (of FIG. 4). In one embodiment, upon receiving the alert, the method may further comprise the user ignoring the alert. In another embodiment, upon receiving the alert, the method may further comprise the user accepting the alert. The manner of ignoring and/or accepting the alert may be accomplished using any method such as selecting an "Acceptance" or "Ignore" button on the GUI 509 (of FIG. 5) or any other suitable manner including voice commands from the user. Furthermore, as mentioned, the establishing of the computerized user profile guideline 200 (of FIGS. 2 and 5) may occur at a remote location from the processor 507 (of FIGS. 4 and 5), wherein the alert is received from cellular channels of a computer 403 (of FIG. 4) running a web application.

If the user accepts the alert, then different options are presented to the user via the GUI 509 (of FIG. 5). The process of accepting the alert may comprise instructing the processor 507 (of FIG. 5) to cause the display of the specified television programming. In other words, the user instructs the processor 507 via the GUI 507 (of FIG. 5) to "watch" the specified television program. If the user wishes to watch the television program, then the television program may be viewed on a liquid crystal display (LCD) screen (not shown) that may be connected to the video decoder 508 (of FIG. 5).

Alternatively, the process of accepting the alert may comprise instructing the processor 507 (of FIG. 5) to record the specified television programming. In this regard, the user may specify the length of the recording (i.e., full program or specified number of minutes, etc.). Preferably, the television program is recorded in a digital format although other suitable formats may be used in accordance with the embodiments herein. Still alternatively, the process of accepting the alert may comprise instructing the processor 507 (of FIG. 5) to simultaneously cause the display of and record (i.e., "watch and record") the specified television programming. In another alternative embodiment, the process of accepting the alert comprises instructing the processor 507 (of FIG. 5) to simultaneously cause the display of a first particular specified television programming and record a second particular specified television programming, wherein the first and second particular specified television programming may be different from one another.

Figure 4:
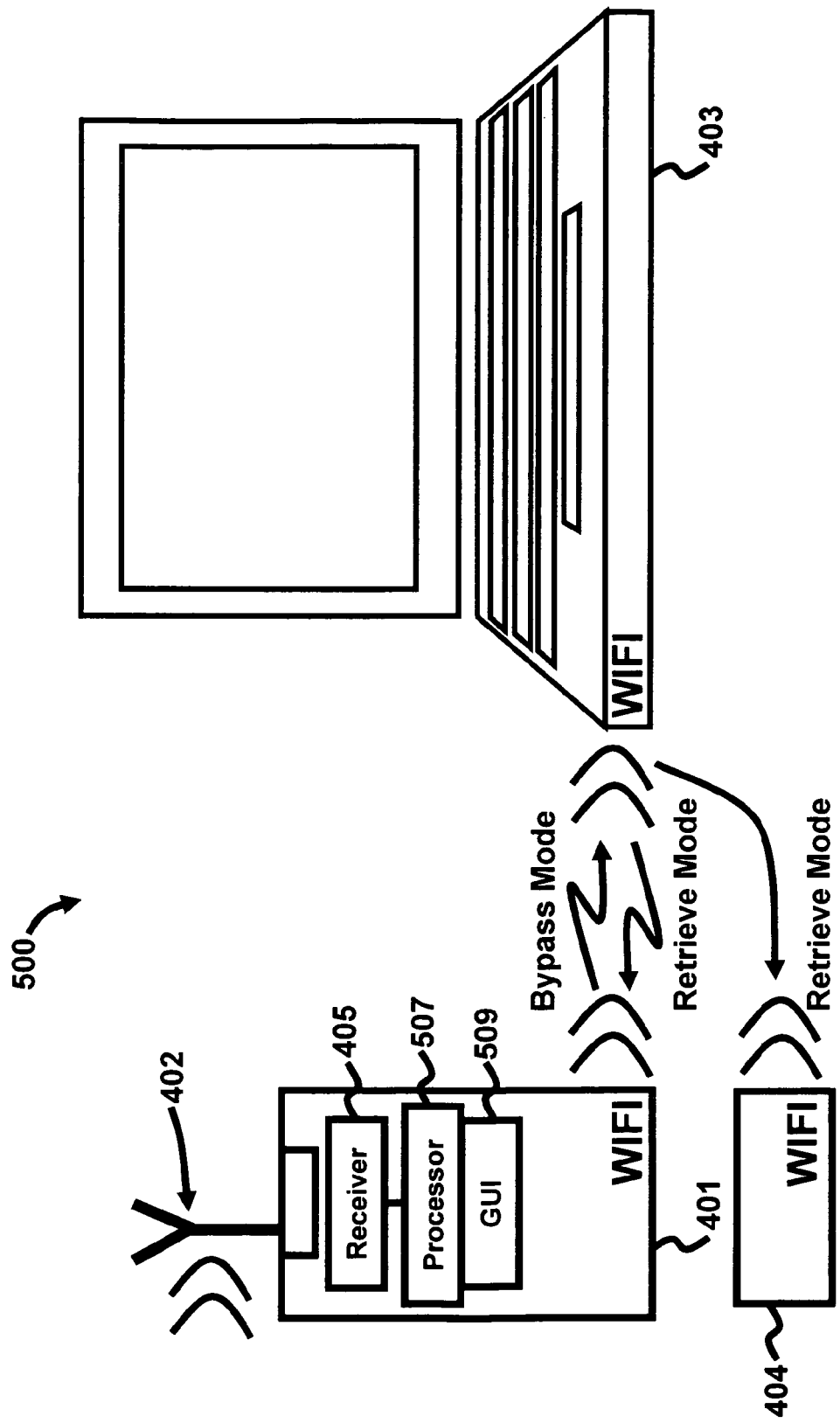
FIG. 4 illustrates a schematic diagram of a bypass and retrieve system according to an embodiment herein.

Yet in another alternative embodiment, the process of accepting the alert may comprise instructing the processor 507 (of FIG. 5) to transmit the specified television programming to a secondary data storage device 403 (of FIG. 4). In other words, the user may instruct the processor 507 via the GUI 507 (of FIG. 5) to "bypass" the primary device's (i.e., portable handheld wireless device 401 (of FIGS. 4 and 5)) storage 511 (of FIG. 5) or secondary data storage device 403 (of FIG. 4).

In another embodiment, upon receiving the alert, the method may further comprise the user accepting streaming media content of the specified television programming. Alternatively, upon receiving the alert, the method may further comprise the user accepting only video content of the specified television programming. Such a situation may be desirable when the user is in an environment where noise levels should be minimized.

Still alternatively, upon receiving the alert, the method may further comprise the user accepting only audio content of the specified television programming. Such a situation may be desirable when the user is in an environment where the video transmission of the television program would be a distraction to the user (for example, during driving). Additionally, the wireless device 401 (of FIGS. 4 and 5) preferably is configured with a volume control and display adjustment controls to further allow the user to control the audio level and video clarity of the television programming transmission.

Yet in another alternative embodiment, upon receiving the alert, the method may further comprise the user delaying acceptance of the specified television programming until a predetermined future time (i.e., snooze feature). For example, the user may be busy at the time that the alert is generated and he/she may simply delay the alert to some time in the future (i.e., 10 minutes, 1 hour, etc.).

The method may further comprise displaying a tabular view of television programming available to be accessed by the user. An example of such a tabular view is provided in the checkerboard record table (i.e., programming guide) 300 shown in FIG. 3. The programming guide 300 (of FIG. 3) may comprise several columns configured to differentiate the television programming that is available to be viewed by a user at any particular time and through specific identifiers (for example, visual cues, audio cues, etc.) the programming guide 300 is configured to indicate the particular status as it pertains to a specific television program (i.e., watch, record, bypass, etc.).

In other words, the method provided by the embodiments herein may further comprise identifying the specified television programming as being either recorded, viewed (i.e., "watch"), or transmitted (i.e., "bypass") to the secondary data storage device 403 (of FIG. 4), wherein the identifying process may comprise color coding selected specified television programming and the particular action to be undertaken for a specified television program (i.e. record, watch, bypass, etc.). In FIG. 3, a user has selected to view certain types of programs specified in the profile guideline 200 (of FIGS. 2 and 5), which the processor 507 in combination with the receiver 405 (of FIG. 4) correlate with corresponding available television programming (i.e., "programs of interest" to the user based on the profile guideline 200 of FIGS. 2 and 5) being broadcasted by a television broadcaster 510 (of FIG. 5). Accordingly, upon the occurrence of a "program of interest" the receiver 405 (of FIG. 4) transmits an alert to the user. More specifically, as shown in FIG. 3, the Sports Recap television program broadcasting at 3:00 PM on Channel C, the Debate television program broadcasting at 3:30 PM on Channel A, and the Stock Picks television program broadcasting at 4:00 PM on channel B, are designated as "television programs of interest" to be viewed and for which the receiver 405 (of FIG. 4) will issue an alert for each program. However, the user has also selected that the Stock Picks television program broadcasting at 4:00 PM on channel B be transmitted (i.e., "bypass") to the secondary data storage device 403 (of FIG.

4). The user may have specifically identified this particular television program to be bypassed in the profile guideline 200 (of FIGS. 2 and 5), or alternatively, the user may have specifically identified this time period (i.e., 4:00 PM) and instructed that any television program being broadcast on a particular channel or related to a particular category 201 (of FIG. 2) to be bypassed to the secondary data storage device 403 (of FIG. 4). Still alternatively, the user may, upon receiving the alert, instruct the processor 507 (of FIG. 5) to transmit (i.e., "bypass") the television program to the secondary data storage device 403 (of FIG. 4). Furthermore, as depicted in FIG. 3, the user has instructed the processor 507 (of FIG. 5) to record the game show television program broadcasting at 4:00 PM on channel D on the data storage device 511 (of FIG. 5) or the secondary data storage device 403 (of FIG. 4).

The programming guide 300, which is extracted by the receiver 405 (of FIG. 4), may by presented to the user on the GUI 509 (of FIGS. 4 and 5), and the user may review and edit his/her selections (and the action to be taken on the television programs) shown in the programming guide 300 (of FIG. 3) at anytime by navigating (i.e., using voice commands or manually scrolling and single button pushing using a mouse, keyboard, or any suitable stylus, for example) according to time frames 307, channels 301, 302, or television programs 303a, 303b, 303c, or any other program feature of the programming guide 300 (of FIG. 3). Preferably, a selected item is highlighted or differentiated from other features in some suitable manner (for example, color coding).

As shown in the tabular format example provided in FIG. 3, the programming guide 300 may comprise a channel lineup column 301, which identifies the number of channels available to be viewed. Next, a corresponding channel name column 302 is provided, which identifies the specific channel name or network name. Then, a time delineated guide is provided according to the specific time period 307 with the corresponding television programs provided in tabular form 303a, 303b, 303c corresponding with the specific channels 302. Scroll buttons 305, 306 are provided for easy navigation through the programming guide 300. Additionally, a bypass column 304 is provided, which identifies specific television programs that are to be transmitted to the secondary data storage device 403 (of FIG. 4).

Moreover, several television programs can be highlighted to be recorded simultaneously. Thus, taking the example shown in FIG. 3, a user could select to simultaneously record both the soccer game being broadcasted on Channel C at 4:00 PM and the game show being broadcasted on Channel D at 4:00 PM. Once again, the user can always review selected television programs for recording and can easily cancel or add new programs to be recorded, or viewed, or bypassed, etc. For example, to cancel programmed recording, the user can simply select the target "highlighted" television program and cancel the programmed recording. This also cancels the highlighting of the target program.

As mentioned, the embodiments herein facilitate bypass and retrieve features, wherein bypassed specified television programs are transmitted and stored to the secondary data storage device 403 (of FIG. 4). Additionally, the stored transmitted specified television programming may be accessed on the secondary data storage device 403 (of FIG. 4). Alternatively, the method includes accessing the stored transmitted specified television programming on a device (such as the handheld wireless device 401 or some other alternate device 404 (of FIG. 4)) other than the secondary data storage device 403 (of FIG. 4). The alternate device 404 may be another portable handheld wireless device, another computer, a television, a receiver, a MP3 player, or any other suitable device.

The bypass mode record feature is a mode that allows a target television program to be streamed out through a wired or wireless interface, for example universal serial bus (USB) or WIFI platforms, and recorded on another platform, for example a laptop computer or any other secondary data storage device 403 (of FIG. 4). This feature is especially useful at the office or at home when a user's behavior may be more tuned towards other activities and is more likely to miss mobile television programming, and at the same time the user is in the vicinity of other more powerful storage devices. By selecting the bypass mode the target television program streams from the receiver 405 (of FIG. 4) directly to the secondary data storage device 403 (of FIG. 4) through a wireless or wired interface. This feature also allows the user to store mass quantities in a library (not shown) of preferred television programs, which can be organized in a suitable manner. The retrieve feature moves content back to the handheld device 401 (of FIGS. 4 and 5) for viewing as well. The library can be retrieved and viewed by other compatible players, and the library may be accessible via the internet. To retrieve the content, the GUI 509 (of FIG. 5) is presented to the user to select the particular television program for viewing. FIG. 4 illustrates the bypass and retrieve modes between a handheld device 401 comprising an antenna 402 adapted to receive radio frequency (RF) signals and another storage device 403 such as a laptop computer through a wired or wireless (for example, WIFI) interface.

The embodiments herein may further comprise updating the content of the stored transmitted specified television programming by using a synchronizer (not shown). This feature builds on top of the bypass and retrieve features to update the media library on the secondary data storage device 403 (of FIG. 4) via a wireless connection by comparing the stored programs on the handheld device 401 (of FIGS. 4 and 5) and synchronizing it by streaming the new content to the library. In another embodiment, the method may further comprise transmitting SMS overlay messages to remote devices (such as other portable handheld devices or any other computer) during broadcasting of the specified television programming, wherein the SMS overlay messages preferably comprise any of audio streaming, video streaming, images, and textual communication. In other words, the SMS overlay feature enables the overlay of SMS and other streaming and textual communications over television programs being viewed and enables "chatting" with multiple users located at multiple locations while watching a particular television program. A system 500 according to one embodiment herein may be implemented as a handheld wireless device 401 as shown in FIG. 4.

The system 500 may further comprise a computer application (not shown) (for example, a web application on a website and located anywhere and in communication with the wireless device 401), wherein the computer application is adapted to infer suitability of potential television programming corresponding to the user based on the user profile guideline 200, and wherein either the receiver 405 (of FIG. 4) or the demodulator 504 (of FIG. 5) is adapted to alert the user of an existence of the potential television programming. Therefore, for example, the computer web application may infer that a user wishes to be alerted each time a sports team located in the user's hometown is in the news or the subject of a television program or part of a television program, then whenever such information is available as television programming (referred to as "potential television programming"), the user is alerted to this information. Hence, the web application may be trained to infer suitable television programming of a user based, in part, on the user's personal interests even if they are broadly identified in the user profile guideline 200.

The handheld wireless device 401 preferably comprises a plurality of antennas 402, 502, which may be adapted to receive respective ones of DVB-H RF signals (emanating from the television broadcaster 510) and cellular RF signals (emanating from a cellular transmission source (not shown)). Next a signal tuner 501 is provided to allow for appropriate tuning of the captured RF signals. The tuner 501 is connected to the demodulator 504 that undoes the modulation that has been performed at the transmitting tower (not shown). The demodulator 504 connects to a link layer 505, which further connects to an IP address capturing/parsing device 506. The link layer 505 functions to (a) extract the multi-protocol encapsulation packets, (b) extract the Forward Error Correction (FEC) data, and (c) extract the service information (SI) and program specific information (PSI). Any additional correction is then performed using the FEC, and the PSI/SI data is parsed to extract the programming guide 300 and any other information (the alert can be embedded anywhere in the data). Finally, the media is passed on to the host processor 507 in the form of IP datagrams. The processor 507 preferably includes a video decoder component 508, which may include an LCD screen (not shown). Moreover, the processor 507 may further include the user-defined profile guideline 200 (of FIG. 2), although the profile guideline 200 may be located at a site remote from the processor 507 and may be transmitted to the processor 507 using a compiler-type mechanism (not shown). The (GUI) 509 (of FIG. 5) is operatively connected to the processor 507 to facilitate user interaction with the handheld wireless device 401. The user-defined profile guideline 200 (of FIG. 2) may also appear on the GUI 509 (of FIG. 5).

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein can take the form of an entirely hardware embodiment, an entirely software embodiment or an embodiment including both hardware and software elements. Preferably, the embodiments are implemented in software, which includes but is not limited to firmware, resident software, microcode, etc.

Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 6:
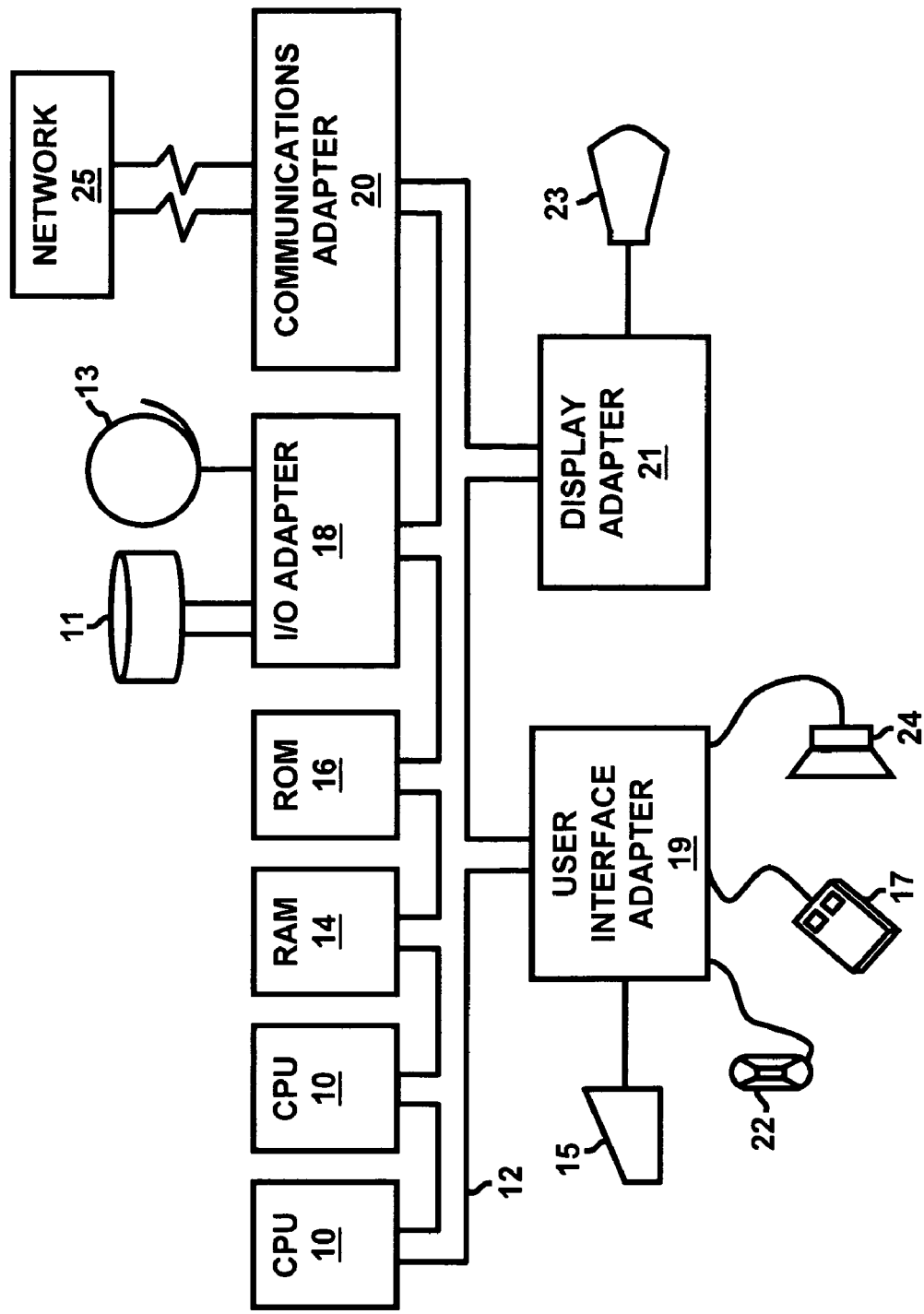
FIG. 6 illustrates a schematic diagram of a computer system according to an embodiment herein.

A representative hardware environment for practicing the embodiments herein is depicted in FIG. 6. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A system comprising:
   a storage device comprising a computerized user profile guideline corresponding to selected television programming interests of a user;
   a processor operatively connected to said storage device, wherein said processor manages data based on said computerized user profile guideline, wherein said data is received from a television programming broadcaster;
   a user interface that manages access to specified television programming when said computerized user profile guideline corresponding to said selected television programming interests of said user is satisfied;
   a short messaging service (SMS) overlay mechanism operatively connected to said processor and adapted to transmit SMS overlay messages to remote devices during broadcasting of said specified television programming;
   a computer application adapted to infer suitability of potential television programming corresponding to said user based on said user profile guideline; and
   any of a receiver and a demodulator operatively connected to said processor, wherein said any of said receiver and said demodulator is adapted to alert said user of an existence of said potential television programming,
   wherein said computerized user profile guideline is established at a remote location from said processor,
   wherein said alert is received from cellular channels of a computer running a web application,
   wherein said user interface is adapted to display a tabular view of television programming available to be accessed by said user,
   wherein said user interface is adapted to identify said specified television programming to be any of recorded, viewed, and transmitted to a secondary data storage device, and
   wherein said user interface identifies said specified television programming to be any of recorded, viewed, and transmitted to a secondary data storage device by color coding selected specified television programming.

* * * * *